United States Patent
Reich et al.

(10) Patent No.: US 11,407,599 B2
(45) Date of Patent: Aug. 9, 2022

(54) APPARATUS FOR FILLING A CONTAINER WITH BULK MATERIAL

(71) Applicant: NOWE GmbH, Elze (DE)

(72) Inventors: Alexander Reich, Meerbusch (DE); Ralf Weiss, Banteln (DE); Werner Bartling, Elze (DE)

(73) Assignee: NOWE GMBH, Elze (DE)

( * ) Notice: Subject to any disclaimer, the term of this patent is extended or adjusted under 35 U.S.C. 154(b) by 0 days.

(21) Appl. No.: 17/280,325

(22) PCT Filed: Apr. 21, 2020

(86) PCT No.: PCT/EP2020/061051
§ 371 (c)(1),
(2) Date: Mar. 26, 2021

(87) PCT Pub. No.: WO2020/216730
PCT Pub. Date: Oct. 29, 2020

(65) Prior Publication Data
US 2021/0403253 A1     Dec. 30, 2021

(30) Foreign Application Priority Data
Apr. 26, 2019 (AT) ............................... A 50383/2019

(51) Int. Cl.
   *B65G 53/66*       (2006.01)
   *B65G 53/12*       (2006.01)
   *B65G 53/42*       (2006.01)

(52) U.S. Cl.
   CPC ............. *B65G 53/12* (2013.01); *B65G 53/42* (2013.01); *B65G 53/66* (2013.01)

(58) Field of Classification Search
   CPC ........ B65G 53/14; B65G 53/16; B65G 53/18; B65G 53/42; B65G 53/50; B65G 53/66;
(Continued)

(56) References Cited

U.S. PATENT DOCUMENTS 1,142,567 A * 6/1915 Jensen ................... B65G 53/30
                                                 406/48
1,908,220 A * 5/1933 Chapman ............... B65G 53/30
                                                 406/92
(Continued)

FOREIGN PATENT DOCUMENTS

| DE | 3410409 A1 | 9/1985 |
| DE | 19935726 A1 | 2/2001 |

(Continued)

OTHER PUBLICATIONS

International Search Report (dated Jul. 14, 2020) and Written Opinion, for International Application No. PCT/EP2020/061051, filed Apr. 21, 2020.

(Continued)

*Primary Examiner* — Joseph A Dillon, Jr.
(74) *Attorney, Agent, or Firm* — Josef L. Hoffmann; The Small Patent Law Group LLC

(57) ABSTRACT

An apparatus for filling a container with bulk material, in particular sand, comprises a storage container for the bulk material with a closable lid and an outlet, a metering device arranged beneath the storage container and a pneumatic feeding device arranged under the metering device for feeding the bulk material into the container to be filled with the aid of compressed air via a feed hose. The feeding device has an injector with a plurality of, preferably at least five, holes for the compressed air.

19 Claims, 3 Drawing Sheets

(58) Field of Classification Search
CPC ...... B65G 2201/045; B65G 2812/1633; B65G 2812/1658; B65G 2812/1666
USPC ...... 406/14, 15, 18, 29, 30, 32, 38, 92, 127, 406/132, 133, 136, 137, 138, 169; 414/507, 518, 519, 539
See application file for complete search history.

(56) References Cited

U.S. PATENT DOCUMENTS

| | | | | |
|---|---|---|---|---|
| 2,192,287 | A * | 3/1940 | Goebels | B65G 53/22 406/138 |
| 2,734,782 | A * | 2/1956 | Galle | B65G 53/22 406/132 |
| 3,504,945 | A * | 4/1970 | Leibundgut | B05C 19/002 406/144 |
| 3,592,363 | A * | 7/1971 | Stout | C21C 7/0037 406/94 |
| 4,019,783 | A * | 4/1977 | Kayser | F23K 3/02 406/144 |
| 4,511,291 | A * | 4/1985 | Quates, Sr. | B65G 53/14 406/128 |
| 4,592,679 | A * | 6/1986 | Boiting | B65G 53/66 406/127 |
| 4,846,608 | A * | 7/1989 | Sanders | B65G 53/14 406/144 |
| 5,340,241 | A * | 8/1994 | Thiele | B65G 53/46 251/147 |
| 5,464,310 | A * | 11/1995 | Federhen | B65G 53/60 210/432 |
| 6,079,911 | A * | 6/2000 | Wangermann | A01M 7/0092 406/122 |
| 6,089,795 | A * | 7/2000 | Booth | B60P 1/60 209/133 |
| 6,461,086 | B1 * | 10/2002 | Milanowski | B65G 53/14 406/173 |
| 6,632,049 | B2 * | 10/2003 | Issler | B65G 53/28 406/144 |
| 6,848,867 | B2 * | 2/2005 | Kroemmer | B65G 53/16 406/91 |
| 6,892,909 | B1 * | 5/2005 | Hebert | A01C 7/081 111/174 |
| 6,974,279 | B2 * | 12/2005 | Morohashi | B65G 53/14 406/173 |
| 7,270,249 | B1 * | 9/2007 | Burkhead | B65G 53/14 222/58 |
| 8,167,516 | B2 * | 5/2012 | Lasko | B05C 11/10 406/92 |
| 8,985,912 | B2 * | 3/2015 | Leininger | B01F 3/18 406/92 |
| 9,248,977 | B2 * | 2/2016 | Carobbio | B65G 47/1407 |
| 2002/0172566 | A1 * | 11/2002 | Issler | B65G 53/42 406/153 |
| 2003/0160459 | A1 * | 8/2003 | Fourcroy | B61K 11/00 291/38 |
| 2008/0044238 | A1 * | 2/2008 | Delves | B01J 8/0025 406/130 |
| 2011/0187128 | A1 * | 8/2011 | Bartling | B60B 39/10 291/23 |
| 2014/0328636 | A1 * | 11/2014 | Stutz, Jr. | B65G 53/40 406/128 |
| 2016/0332639 | A1 * | 11/2016 | Bartling | B05C 19/06 |
| 2021/0146966 | A1 * | 5/2021 | Reich | B61C 15/102 |

FOREIGN PATENT DOCUMENTS

| | | |
|---|---|---|
| DE | 19935796 A1 | 2/2001 |
| EP | 0561679 A1 | 9/1993 |
| GB | 2528954 A | 2/2016 |
| JP | S4824196 B1 | 7/1973 |
| JP | S50 152393 U | 12/1975 |
| JP | S50152393 | 12/1975 |
| JP | S51 58284 A | 5/1976 |
| JP | S5158284 A | 5/1976 |
| RU | 2291831 C1 | 1/2007 |
| RU | 2418732 C2 | 5/2011 |
| SU | 700403 A1 | 11/1979 |
| SU | 1393723 A2 | 5/1988 |
| SU | 1418224 A2 | 8/1988 |
| WO | 2002/036468 A1 | 5/2002 |
| WO | 2002036468 A1 | 5/2002 |
| WO | 2020/030559 A1 | 2/2020 |

OTHER PUBLICATIONS

Office Action dated Jan. 20, 2020 for Austrian Application No. 50383/2019, filed Apr. 26, 2019.
Examination Report issued for related Indian Patent Application No. 202117010475 dated Feb. 17, 2022 (6 pages).
Russian Search Report issued for related Russian Patent Application No. 2021111375 dated Mar. 22, 2022 (3 pages).
Russian Official Action for related Russian Patent Application No. 2021111375 dated Mar. 22, 2022 (6 pages).

* cited by examiner

APPARATUS FOR FILLING A CONTAINER WITH BULK MATERIAL

FIELD OF THE INVENTION

The invention relates to an apparatus for filling a container with bulk material, in particular sand, comprising a storage container for the bulk material with a closable lid and an outlet, a metering device arranged beneath the storage container and a pneumatic feeding device arranged under the metering device for feeding the bulk material into the container to be filled with the aid of compressed air via a feed hose.

BACKGROUND OF THE INVENTION

The present invention relates principally but not exclusively to an apparatus for filling a sand container such as is used in particular in rail-mounted and driven vehicles in sanding systems for supporting the braking and drive technology. The containers for the bulk material, in particular the sand containers in vehicles, in particular rail vehicles, are usually filled by hand or semi-automatically with the bulk material, in particular grit. Apart from the fact that the filling of bulk material containers is very time-consuming and physically demanding, this frequently also results in considerable formation of dust with the result that the health of the staff is endangered or protective measures are required.

Stationary filling apparatuses additionally have the disadvantage that in the case of various vehicles whose storage containers are to be filled with bulk material and with various vehicle lengths, various feed paths must be created for the bulk material and bridged, with the result that the filling process takes even longer and the costs also increase.

EP 561 679 B1 describes an apparatus for the filling of a container with bulk material, wherein the bulk material is transported pneumatically via a hose line into the container to be filled. The end of the hose line is held manually in the opening of the container to be filled by the operating staff.

US 2003/0160459 A1 describes an apparatus for filling a sand container in a rail vehicle, wherein the bulk material is stored in a pressurized container and transported via a line into the container to be filled. Since the storage container for the bulk material comprises a pressure container, this must be designed to be particularly robust and heavy, which requires a fixed position of the storage container, with the result that the filling apparatus is very inflexible or large lengths of hose must be bridged for filling.

A mobile filling apparatus of the present type is described, for example, in DE 19 935 726 A1, wherein the metering of the bulk material is accomplished via a poppet valve in the lower region of the storage container into a further container, the transfer container, which is pressurized for the pneumatic conveyance of the metered bulk material via a compressed air line. Since the transfer container is configured as a pressure container, this means a higher constructive expenditure. Furthermore blockages of the conveyor hose can occur relatively easily when too much bulk material is metered in the transfer container.

SUMMARY OF THE INVENTION

One aspect of the present invention relates to an aforesaid filling apparatus which allows a particularly simple and rapid filling of the container with bulk material and in addition is constructed in the simplest possible and most space-saving manner so that a mobile application can also be provided. Disadvantages of known filling apparatuses should be avoided or at least reduced.

Disclosed herein are embodiments of the aforesaid filling apparatus in which the feeding device has an injector with a plurality of holes for the compressed air. As a result of the specially configured feeding device in the form of a so-called propulsive jet injector with a plurality of holes for the compressed air for feeding the bulk material, a simple, energy-efficient and uniform feeding of the bulk material through the feed hose can be achieved even over larger feed lengths and with differences in height. Since the compressed air is only introduced into the feeding device formed by the injector, neither the metering device nor the storage container needs to be robust or designed as a pressure container. As a result, the components can be produced very cost-effectively and with low weight, for example, by using light metal. As a result of the plurality of holes for the compressed air in the injector, even at low pressure a uniform pneumatic feeding of the bulk material through the feed hose can be achieved. Since the bulk material is transported through the feed hose in a quasi-suspended manner, less abrasion takes place at the inner wall of the feed hose with the result that the lifetime of the feed hose can be increased or the feed hose need not be designed to be particularly robust. Since the components of the filling apparatus can be configured to be relatively simple and light, this results in low manufacturing costs and a low overall weight with the result that the components can be arranged in a simple manner even on a platform which is configured to be mobile.

Preferably the injector has at least five holes. This has corresponding advantages with regard to the feeding of the bulk material through the feed hose.

According to a further feature of the invention, one hole in the injector is arranged to run centrally and the further holes are arranged in a circular shape around the central hole, preferably at the same angular distances from one another. As a result of such a design of the holes in the injector, a relatively uniform flow profile inside the feed hose and therefore a uniform feeding of the bulk material in the feed hose is achieved.

In this case, the holes arranged around the central hole are preferably arranged so that they run outwards conically. Due to such an oblique arrangement of the outer holes, an optimal distribution of the compressed air takes place over the cross-section of the outlet of the injector or the cross-section of the feed hose. The inclination of the outer holes can, for example, be in the range between 2.5 and 7.5 degrees depending on the design.

The storage container is substantially cylindrical and configured to converge conically towards the outlet. This constitutes a usual but advantageous embodiment of a container for bulk material whereby it is ensured that the bulk material arrives at the outlet at the lowest point due to gravity without means for feeding the bulk material to the outlet being required.

Since the storage container is not exposed to any pressure and this therefore need not be designed as a pressure container, it can be formed of aluminium or an aluminium alloy and can be designed to be correspondingly light. Naturally suitable plastic materials can also be used for the storage container.

A pressure relief valve can be arranged on the storage container in order to be able to release any excess pressure in the storage container.

If a viewing glass is arranged in the storage container, a visual inspection of the fill level of the bulk material can be made.

Additionally or alternatively to a viewing glass, a sensor for detecting the fill level of the bulk material can be provided in the storage container. This sensor can, for example, be implemented in the form of a capacitive sensor. Other types of sensor, for example, sensors which measure the weight of the storage container or ultrasound sensors or optical sensors which measure the fill level in a contactless manner are also feasible.

The metering device can be formed by a pneumatically or electromagnetically actuatable metering piston and a return spring. This forms a simple and robust embodiment of a metering device. When using a pneumatically actuated metering piston, there is the advantage that the compressed air necessary in any case for feeding the bulk material can also be used for the metering. When using an electromagnetically actuatable metering piston on the other hand, an electrical lead is required which, however, is usually required for other components of the filling apparatus and is present in any case.

If the metering device has an adjusting screw for adjusting the opening of the metering piston, a simple and robust specification of the maximum metering during a single piston stroke of the metering piston can be performed. The further metering of the bulk material can be adjusted by controlling the opening time of the metering piston and/or the number of necessary piston strokes.

In the lower region of the storage container above the outlet at least one nozzle can open into the storage container which at least one nozzle is connected to a pressure regulator by means of a compressed air line. By means of such a so-called bypass line the bulk material can be loosened in the region of the outlet and thus the metering of the bulk material can be supported and any blocking of the bulk material in the region of the outlet can be prevented.

Preferably a control device is provided in the apparatus which controls the filling apparatus, which results in a simple handling for the user. The control device is preferably formed by a microprocessor or microcontroller which is supplied with electrical energy by a corresponding voltage supply. The control device is connected to operating elements or a user interface in order to enable various settings.

This control device can be configured for active activation of the feeding device over a predefined time interval after deactivation of the feeding of the bulk material. As a result, the feed hose can be blown free of bulk material, in particular sand. By this means, when pulling out the feed hose from the opening of the container to be filled, sand can be prevented from trickling out of the feed hose and resulting in contaminations and dust formation. By means of such a time-controlled after-blowing function after completion of the filling process which is, for example, maintained over several seconds, the feed hose can thus be kept free of bulk material residue. Instead of specifying a specific time interval, a sensor in the feed hose can also provide the information that no more bulk material is being fed and the after-blowing function is stopped automatically depending on the sensor signal.

A pressure sensor can be arranged in the feeding device which pressure sensor is connected to the control device. By means of such a pressure sensor, the counter-pressure which is established when the container to be filled reaches the filling limit can be detected in a simple manner. Upon detecting such a counter-pressure which, for example, lies in the range of a few millibar, an automatic switch-off of the feeding of the bulk material is initiated.

Furthermore, a sensor for detecting the flow of bulk material can be provided in the feeding device), which sensor is connected to the control device. As a result, a monitoring of the flow of bulk material can be performed during feeding and for example, blockages can be determined automatically and result in the output of an optical or acoustic message or also in the automatic switch-off of the feeding. If no flow of bulk material is determined even after activating the feeding, this can also be an indication that no more bulk material is present in the storage container or a blockage has occurred in the feed line. During the ongoing filling process, fluctuations of the flow sensor are an indication of fluctuations or also of interruptions of the feeding of the bulk material.

If a compressed air connection is provided at the filling apparatus, an existing compressed air line can be connected thereto and in this way the filling apparatus can be supplied with the necessary compressed air.

Alternatively or additionally to a compressed air connection, a compressor can also be provided to provide the compressed air.

According to a further feature of the invention, a blow-out lance is arranged at the free end of the feed hose. By means of such a blow-out lance, the end of the feed hose can also be optimally placed in an opening adapted thereto or the filling connector in the container to be filled.

If an extraction nozzle is arranged at the blow-out lance, any dust produced during the filling process can be extracted and escape into the atmosphere can be prevented. As a result, it is not necessary for the operating staff to use protective apparatus such as, for example, respiratory masks.

The extraction nozzle is preferably arranged displaceably and fixably in the longitudinal direction of the blow-out lance. As a result, an optimal positioning of the extraction nozzle and therefore an optimal detection of dust or extraction of dust can be performed.

The extraction nozzle is connected via an extraction hose to an extraction and dust removal device. In the dust removal device the dust detected and extracted if necessary is collected in corresponding collecting containers and can be simply and reliably removed in this way. Since dust from bulk material, in particular grit is usually inhalable dust, this waste should be treated as hazardous material and must be appropriately disposed of.

The extraction and dust removal device preferably comprises a filter and a dust collecting container. Any escape of the dust which possibly occurs during filling into the atmosphere is largely prevented by components in the extraction and dust removal device. Depending on the bulk material used and dust which occurs, suitable filters, for example, microfine filters are used accordingly. The filter system can have an automatic filter cleaning function which allows trouble-free operation of the extraction and dust removal device and therefore of the entire filling apparatus.

An actuating element, preferably an on/off switch can be arranged at the blow-out lance, which actuating element is connected to the control device. By means of the actuating element, the operating staff can thus undertake a control of the filling process even at a certain distance from the filling apparatus.

The feed hose, the extraction hose and any electrical leads can be connected to one another via clips or the like. By means of this measure, the weight of the feed hose is certainly increased slightly and therefore its handling made more difficult but as a result of the plurality of hoses or lines, this results in no entanglements of the same. The risk of tripping over the hoses or lines can also be minimized thereby.

If wheels or the like are provided, the filling apparatus can be transported particularly easily and brought rapidly into the vicinity of the container to be filled. Furthermore, the length of the feed hose can be reduced and the pressure necessary for feeding the bulk material can be reduced. Instead of or in addition to wheels, runners can also be arranged on the underside of the filling apparatus which make it possible to lift and manoeuvre the filling apparatus with the aid of a fork lift truck or the like. Furthermore, hooks, eyes or the like can also be arranged on the upper side of the filling apparatus which allow a movement of the filling apparatus with the aid of a crane.

A manoeuvring of the filling apparatus can be made easier if at least one wheel is connected to a drive, preferably an electric drive.

If an energy storage device, in particular an accumulator, is provided on the apparatus for the provision of electrical energy, this can result in an independence from the connection of a power supply network at least over certain time intervals and a cable lead to the filling apparatus can be omitted.

BRIEF DESCRIPTION OF THE DRAWINGS

The present invention is explained in detail with reference to the appended drawings. In the figures.

DETAILED DESCRIPTION OF THE INVENTION

Figure 1:
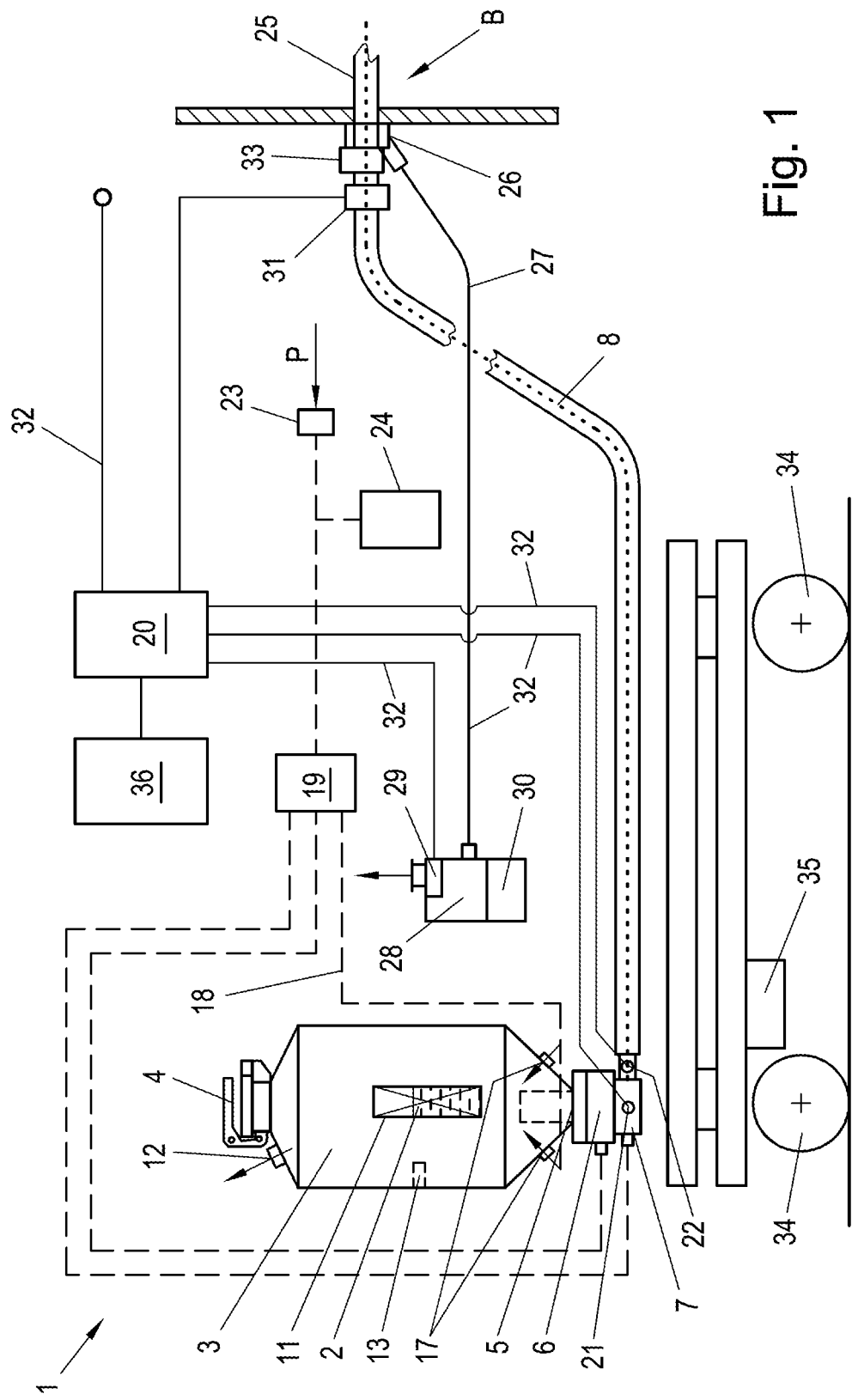
FIG. 1 shows a schematic view of an apparatus for filling a container with bulk material, in particular sand.

FIG. 1 shows schematically an apparatus 1 for filling a container B with bulk material 2, in particular sand. The apparatus 1 comprises a storage container 3 for the bulk material 2 with a closable lid 4, preferably on the upper side. Located on the lower side of the storage container 3 is an outlet 5 via which the bulk material 2 passes into the metering device 6 located thereunder. In the present design of the filling apparatus 1 the storage container 3 is not designed as a pressure container which is why this can be formed of light metal, for example, aluminium or an aluminium alloy or even plastic and has a relatively low weight. The storage container 3 is preferably substantially cylindrical and is configured to converge conically towards the outlet 5. A visual inspection of the fill level of the bulk material 2 can be performed by means of a viewing glass 11 which may be present in the storage container 3. Alternatively or additionally sensors 13 can also be arranged in the storage container 3 to detect the fill level of the bulk material 2. Such sensors 13 can be implemented in various ways, for example, as capacitive or optical sensors. Located below the metering device 6 is the pneumatic feeding device 7 for feeding the bulk material 2 which is configured in the form of an injector 9 with a plurality of holes 10, 10' for the compressed air P (see FIG. 2).

Preferably a pressure relief valve 12 can be arranged on the upper side of the storage container 3 via which excess pressure, in particular during filling of the storage container 3, can escape. The compressed air P is provided via a compressed air connection 23 or via its own compressor 24 and is guided via a pressure regulator 19 to the different positions, in particular the pneumatic feeding device 7 and the metering device 6 which is pneumatically configured if necessary. In addition, compressed air lines 18 can be provided which open into at least one nozzle 17 in the lower region of the storage container 3 above the outlet 5. By means of such a so-called bypass line, the running of the bulk material 2, in particular sand, can be supported and the bulk material 2 can be loosened by appropriate regulation of the air volume and air pressure which passes to the nozzle 17 via the pressure line 18. The quantity of the bulk material 2 running out via the outlet 5 in the storage container 3 can be influenced in a very simple manner via the pressure regulator 19.

The feed hose 8 is connected at the outlet of the pneumatic feeding device 7 via which the bulk material 2 is transported through the feed hose 8 in a substantially suspended manner. A blow-out lance 25 is preferably arranged at the free end of the feed hose 8, which forms the connecting piece to the filling connector of the container B to be filled, for example, in a vehicle, in particular rail vehicle. The blow-out lance 25 is preferably designed as a thick-walled stainless steel tube and provided in a corresponding length depending on the respective type of vehicle. A pressure sensor 21 and a sensor 22 for measuring the flow of the bulk material 2 can be arranged in the pneumatic feeding device 7. A counter-pressure can be detected by means of the pressure sensor 21 and an automatic switch-off of the feeding of the bulk material 2 can be initiated. A counter-pressure of at least 2 mbar, for example, can be detected easily by means of measurement technology. The sensor 22 for measurement of the flow of bulk material 2 can deliver important information about any blockages or an irregular feeding of the bulk material 2.

Preferably a control device 20 is provided which is connected with the most important components of the filling apparatus 1, in particular the said pressure sensor 21, the sensor 22 for detecting the flow of bulk material or an actuating element 31 preferably arranged at the end of the feed hose 8 or the blow-out lance 25. The control device 20 is supplied with electrical energy via a corresponding electrical line 32. Alternatively to this or also additionally, an energy storage device 36, in particular an accumulator can be provided which supplies electrical energy for the duration of the filling process for the supply of the electrical components.

Preferably arranged on the blow-out lance 25 is an extraction nozzle 26 which is preferably displaceable and fixable in the longitudinal direction of the blow-out lance 25 so that a corresponding adaptation to the respective structural circumstances can be made. Any dust produced during the filling process is extracted via the extraction nozzle 26 and collected along an extraction hose 27 in an extraction and dust removal device 28, preferably with a filter 29 and a dust collecting container 30. As a result, any contamination can be prevented or at least reduced and any danger to staff due to the dust can be avoided.

The feed hose 8 and extraction hose 27 and any electrical leads 32 can be connected to one another via suitable clips 33 or the like.

If all the components of the filling apparatus 1 are arranged on a suitable support platform and wheels 34 or the like can be provided thereon, the filling apparatus 1 can be easily moved to the container 3 to be filled with the result that shorter feed paths result and in consequence the energy costs can be reduced. If at least one wheel 34 is connected to a corresponding drive 35, the movement of the filling apparatus 1 can be facilitated.

Figure 2:
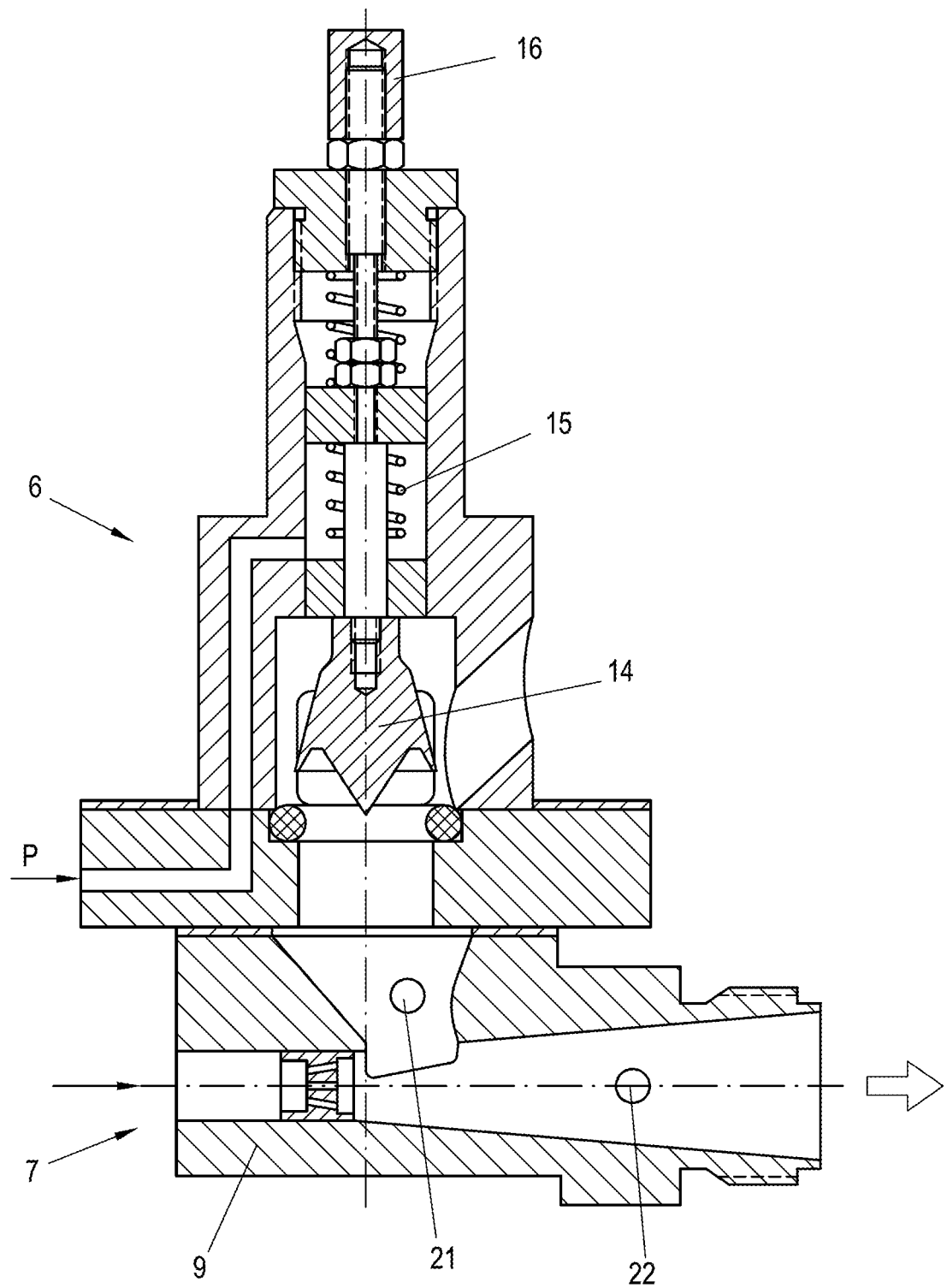
FIG. 2 shows a schematic detailed view of the metering and feeding device of a filling apparatus in cutaway view.

FIG. 2 shows a schematic detailed view of the metering device 6 and feeding device of a filling apparatus 1 in cutaway view. In this embodiment the metering device 6 is also operated with compressed air P by providing a pneumatically actuatable metering piston 14 and a return spring 15. By blowing in compressed air P, the metering piston 14 can be moved against the return spring 15 and the bulk material 2 passes into the metering device 6 via a corresponding sand feed, here arranged obliquely, and further into the pneumatic feeding device 7 arranged thereunder. Instead of a pneumatically actuatable metering piston 14, an electromagnetically actuatable metering piston 14 and a corresponding return spring 15 can form the metering device 6 (not shown).

The pneumatic feeding device 7 is formed in the form of an injector 9 with a plurality of, preferably at least 5, holes 10, 10', wherein one hole 10 is arranged to run centrally in the injector 9 and the further holes 10' are arranged circularly around the central hole 10, preferably at the same angular distances to one another. The holes 10' arranged around the central hole 10 can be arranged to run outwards. This construction of a so-called propellant jet nozzle ensures an optimal feeding of the bulk material 2 in the feed hose 8 which is arranged following the pneumatic feeding device 7. As already mentioned above, a pressure sensor 21 and/or a sensor 22 for detecting the flow of the bulk material 2 can be provided in the pneumatic feeding device 7, which sensors are connected to the control device 20.

Figure 3:
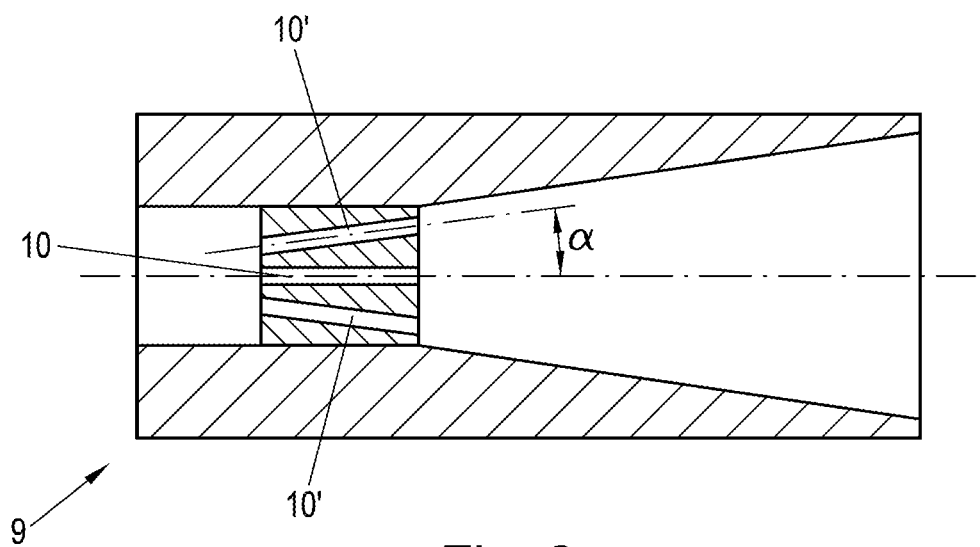
FIG. 3 shows a detail of the feeding device according to FIG. 2 configured as an injector in enlarged view.

FIG. 3 shows a detail of the pneumatic feeding device 7 configured as injector 9 according to FIG. 2 in enlarged view. Here the holes 10, 10' for the compressed air P are easier to see. As already mentioned, the outer holes 10' arranged around the central hole 10 can be arranged to run conically outwards, for example, at an angle $\alpha$ between 2.5 and 7.5 degrees. This ensures an optimal flow profile of the compressed air P in the outlet of the injector 9 and in the feed hose 8 and as a result, a quasi-suspended conveyance of the bulk material 2 inside the feed hose 8 to the container B to be filled.

Figure 4:
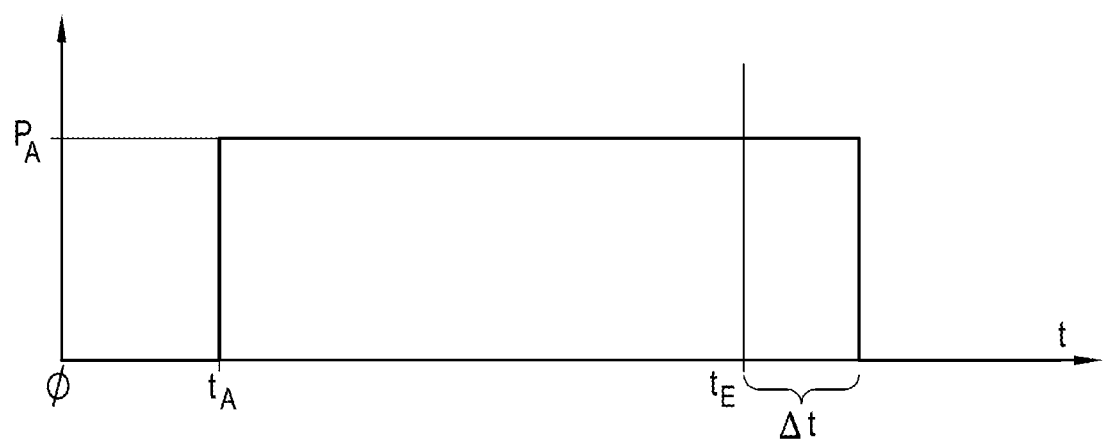
FIG. 4 shows the time behaviour of the compressed air for operating the feeding device according to a preferred exemplary embodiment.

Finally FIG. 4 shows the time behaviour of the compressed air P for operating the pneumatic feeding device 7 according to a preferred exemplary embodiment. At the time $t_A$, the pneumatic feeding device 7 is activated by applying the corresponding compressed air P with a working pressure PA to the pneumatic feeding device 7 and thus the compressed air P passes into the pneumatic feeding device 7 via the holes 10, 10'. At the time $t_E$ the feeding of the bulk material 2 is ended. According to a preferred exemplary embodiment, the pneumatic feeding device 7 is operated further over a pre-settable time interval $\Delta t$, that is compressed air P is still blown into the pneumatic feeding device 7, with the result that the feeding device 7 and the feed hose 8 can be blown free of bulk material 2. Depending on the length of the feed hose 8, the time interval $\Delta t$ of the after-blowing function can, for example, be between 3 and 10 seconds. Instead of a pre-set time interval $\Delta t$, the end of the flow of bulk material 2 through the feed hose 8 can also be detected with the aid of suitably arranged sensors and then the compressed air P can be switched off.

The invention claimed is:

1. An apparatus for filling a container with bulk material comprising:
    a storage container for bulk material with a closable lid and an outlet;
    a metering device beneath the storage container;
    a pneumatic feeding device beneath the metering device for feeding the bulk material into the storage container;
    a feed hose configured to fill the pneumatic feeding device with air; the pneumatic feeding device having an injector with one or more a plurality of holes for receiving compressed air, at least one of which is angularly displaced relative to a flow centerline
    a control device configured to activate the pneumatic feeding device over a predefined time interval after deactivation of the feeding of the bulk material to remove the bulk material from the feed hose; and
    a sensor inside the feeding device and connected to the control device, the sensor configured to detect flow of the bulk material through the feed hose,
    the sensor configured to provide output to the control device indicating flow of the bulk material, the control device configured to deactivate the pneumatic feeding device based on the output from the sensor.

2. The apparatus according to claim 1, wherein the injector has at least five of the holes.

3. The apparatus according to claim 1, wherein the one or more holes includes a central hole in the injector and additional holes arranged circularly around the central hole at the same angular distances from one another.

4. The apparatus according to claim 3, wherein the additional holes arranged around the central hole conically extend outward.

5. The apparatus according to claim 1, further comprising a second sensor for detecting the fill level of the bulk material in the storage container.

6. The apparatus according to claim 1, wherein the metering device includes an actuatable metering piston and a return spring.

7. The apparatus according to claim 1, wherein a lower region of the storage container above the outlet includes at least one nozzle that opens into the storage container and is connected to a pressure regulator by an air line.

8. The apparatus according to claim 1, further comprising an air connection.

9. The apparatus according to claim 1, further comprising a compressor configured to provide the air.

10. The apparatus according to claim 1, wherein a blow-out lance is at a free end of the feed hose.

11. The apparatus according to claim 10, wherein an extraction nozzle is at the blow-out lance.

12. The apparatus according to claim 11, wherein the extraction nozzle is arranged displaceably and fixably in a longitudinal direction of the blow-out lance.

13. The apparatus according to claim 10, wherein the extraction nozzle is connected to an extraction and dust removal device via an extraction hose.

14. The apparatus according to claim 10, wherein an actuating element is at the blow-out lance, and an actuating element is connected to the control device.

15. The apparatus according to claim 1, further comprising a platform having at least one wheel connected to a drive that is coupled to the storage container.

16. The apparatus according to claim 1, further comprising an accumulator energy storage device configured to power the pneumatic feeding device.

17. An apparatus for filling a container with bulk material, comprising:
    a storage container for bulk material with a closable lid and an outlet;
    a metering device beneath the storage container;
    a pneumatic feeding device beneath the metering device for receiving compressed air via a feed hose and feeding the bulk material into the container; the pneumatic feeding device having an injector with a plurality of holes compressed air, at least one of which is angularly displaced relative to a flow centerline, the pneumatic feeding device having a pressure sensor;

a control device configured to activate the pneumatic feeding device during a predefined time interval after cessation of feeding the bulk material into the container; wherein a pressure sensor is in the feeding device and wherein the pressure sensor is connected to the control device; and wherein the control device is configured to deactivate the pneumatic feeding device based on an output from the pressure sensor.

18. The apparatus according to claim 17, wherein the plurality of holes include a central hole in the injector and additional holes are arranged circularly around the central hole at the same angular distances from one another.

19. The apparatus according to claim 18, wherein the additional holes of the plurality of holes are arranged around the central hole and conically extend outward.

* * * * *